Patented Sept. 4, 1951

2,567,109

UNITED STATES PATENT OFFICE 2,567,109

INITIATOR SYSTEMS COMPRISING A TITANOUS COMPOUND AND NITROGEN COMPOUNDS SUCH AS OXIMES

Edward G. Howard, Jr., Wilmington, Del., assignor to E. I. du Pont de Nemours and Company, Wilmington, Del., a corporation of Delaware No Drawing. Application July 15, 1950, Serial No. 174,130

13 Claims. (Cl. 260—80)

1

This invention relates to the addition polymerization of polymerizable organic compounds and more particularly to new polymerization catalyst systems.

Polymerization of ethylenically unsaturated compounds is a process of great technical importance. Generally employed as polymerization catalysts are compounds containing directly linked oxygen or nitrogen atoms such as benzoyl peroxide, potassium persulfate or alpha,alpha'-azodiisobutyronitrile. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low. Accordingly, new and improved systems of low temperature addition polymerization in high conversion are of considerable interest.

This invention has as an object the provision of new catalyst systems for addition polymerization. Another object is the provision of new polymerization processes. Other objects will appear hereinafter.

These objects are accomplished by the present invention wherein a monomer subject to addition polymerization by reason of a non-aromatic carbon to carbon double bond is polymerized at low temperatures and at a rapid rate by bringing the monomer in contact in an aqueous system with trivalent titanous ion and a compound which contains trivalent nitrogen in which compound the nitrogen is bonded by a single valence bond, i. e., covalent link, to oxygen. The preferred nitrogen compounds are the oximes, such as hydroxylamine, and their derivatives.

The following examples in which parts are by weight are illustrative of the invention.

Example I

A glass vessel was charged with 13.2 parts of acrylonitrile, 56 parts of ethyl alcohol, 10 parts of water, 10 parts of 0.25 molar aqueous titanium trichloride, and 0.17 part of hydroxylamine hydrochloride. After two and a half hours at −40° C., there was obtained a 20% yield of polymer.

Example II

A glass vessel was charged with 13.2 parts of acrylonitrile, 40 parts of ethyl alcohol, 40 parts of water, 10 parts of 0.25 molar aqueous titanium trichloride and 0.17 part of hydroxylamine hydrochloride. A 46% yield (6.1 parts) of polymer was obtained in one-half hour at −22° C.

Example III

The following materials were placed in a glass container: 13.2 parts of acrylonitrile, 220 parts of water, 2 parts of a 20% solution of titanium trichloride in water and 0.21 part of hydroxylamine sulfate. After one-half hour at 0° C., a 19% yield of polymer was obtained.

When the hydroxylamine was omitted no polymer was obtained.

Example IV

When the general procedure of Example III was repeated except that 0.3 part of cyclohexanone oxime was used in place of the hydroxylamine and the temperature was 25° C., a 61% yield of polymer resulted.

Example V

When the general procedure of Example III was repeated except that 0.18 part of propional oxime was used in place of the hydroxylamine and the time was increased to two hours, a 64% conversion to polymer occurred.

Example VI

When the general procedure of Example III was repeated except that 0.33 part of the hydroxylamine salt of sebacic acid was used in place of the hydroxylamine, a 52% yield of polymer was obtained.

Example VII

When the general procedure of Example III was repeated except 0.22 part of adipic acid hydroxamide, (adipohydroxamic acid), was employed and the time increased to three hours, a 37% yield of polymer resulted.

Example VIII

When the general procedure of Example III was repeated except that 0.43 part of benzenesulfonyl hydroxamide (benzenesulfohydroxamic acid) was employed in place of the hydroxylamine, there was obtained a 72% yield of polymer.

Example IX

When the general procedure of Example III was repeated except that 0.18 part of acetone oxime was used in place of the hydroxylamine and the time was increased to two hours, a 65% yield of polymer resulted.

Example X

When Example IX was repeated except that the temperature was 27° C., within thirty-six minutes a 76% conversion to polymer resulted.

Example XI

When the general procedure of Example III was repeated except that 1.06 parts of potassium hydroxylaminetrisulfonatedihydrate, $$KO_3SON(SO_3K)_2 \cdot 2H_2O$$

was used as the hydroxylamino compound and the time was increased to six hours, a 31% yield of polymer was obtained.

Example XII

When the general procedure of Example III was repeated except that 0.25 part of the monooxime of dimethyl glyoxal was used as the hydroxylamino compound, there was obtained a 39% yield of polymer in four hours at 25° C. A similar yield (36%) was obtained when the dioxime was used with the substitution of a mixture of alcohol (50 parts) and 40 parts of water for the 220 parts of water of Example III.

Example XIII

When the general procedure of Example III was repeated except that 0.75 part of potassium hydroxylaminedisulfonatedihydrate $$(HON(SO_3K)_2 \cdot 2H_2O)$$

was employed as the hydroxylamino compound, an 11% yield of polymer was obtained.

Example XIV

When Example XIII was repeated except that the water was replaced by a mixture of 56 parts of ethyl alcohol and 70 parts of water and the temperature was lowered to —23° C., a 14% conversion resulted.

Example XV

When Example III was repeated except that 0.39 part of 3, 3, 5-trimethylhexanal oxime was used in place of the hydroxylamine and 40 parts of ethyl alcohol was added, in three hours at 25° C., a 35% yield of polymer was obtained.

Example XVI

A pressure-resistant glass vessel was charged with 15.6 parts of vinyl chloride, 80 parts of ethyl alcohol, 30 parts of water, 2 parts of 20% aqueous solution of titanium trichloride and 0.17 part of hydroxylamine hydrochloride. In one-half hour at about —21 to —23° C., a 51% yield was obtained.

Example XVII

When the general procedure of Example XV was repeated except that 56 parts of alcohol and 50 parts of water were present and the temperature was 0° C., a 38% yield of polymer was obtained in fifteen minutes.

Example XVIII

A stainless steel pressure resistant vessel capable of containing 1700 parts of water was charged with 300 parts of tertiary butyl alcohol, 100 parts of oxygen-free water, 8 parts of 20% titanium trichloride solution and 0.72 part of acetone oxime. After 18 hours at 25° C. and at 1000 atmospheres of ethylene, a pressure drop of 145 atmospheres was noted. After excess ethylene was removed, hydrochloric acid was added and the alcohol partially removed by evaporation. Water was added and polymeric ethylene removed by filtration. The polymer which amounted to 6 parts had a relative viscosity measured on a 0.1% solution in xylene at 85° C. of 1.036. A film was obtained by heating the polymer under pressure.

Example XIX

A mixture of 100 parts of water and 13 parts of acrylonitrile was chilled to 0° C. by immersion of the container in an ice-salt bath. To this cooled mixture was added 2.7 parts of beta-methylene-beta-propiolactone (mole ratio acrylonitrile/beta-methylene-beta-propiolactone =7.5/1), 2 parts of an approximately 20% solution of titanous chloride (TiCl$_3$) and 0.43 part of benzenesulfohydroxamic acid. The polymerization began to take place immediately as evidenced by the turbidity in the reaction mixture. After standing for three hours at 0 to —3° C., the reaction mixture was filtered. The product was washed on a funnel with water followed by methanol and dried in a vacuum oven giving 7.88 parts (50% yield) of white amorphous acrylonitrile/beta-methylene - beta - propiolactone copolymer. Analysis indicated that the polymer contained 23.61% nitrogen which corresponds to a beta-methylene-beta-propiolactone content of 10.7% or an acrylonitrile/beta-methylene-beta-propiolactone ratio of 13.5/1 and had an intrinsic viscosity of 0.73 measured on 0.2% solution in dimethylformamide.

Example XX

A glass vessel was charged with 12.5 parts of methyl methacrylate, 49 parts of water, 48 parts of ethyl alcohol, one part of a 20% solution of titanium trichloride in water and 0.22 part of benzene-sulfohydroxamic acid. After one-half hour a 0° C., a 63% yield of polymer was obtained.

The process of this invention is of generic application to the addition polymerization of polymerizable compounds having the non-aromatic, or ethylenic >C=C< group. It is particularly applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the CH$_2$=C< group.

Compounds having a terminal methylene which are subject to polymerization and copolymerization with the initiators of this invention include olefins, e. g., ethylene, isobutylene; acrylyl and alkacrylyl compounds, e. g., acrylonitrile, methyl acrylate, ethyl methacrylate, methacrylic acid, methacrylamide; vinyl and vinylidene halides, e. g., vinyl chloride, vinylidene chloride; vinyl carboxylates, e. g., vinyl acetate, vinyl trimethylacetate; vinyl imides, e. g., N-vinylphthalimide; N-vinyllactams, e. g., N-vinylcaprolactam; vinyl acryls such as styrene and other vinyl derivatives such as the vinylpyridines, methyl vinyl ketone and vinyl ethyl ether.

Fluoroethylenes, including vinyl fluoride, tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that similarly may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, may be effected by the process of this invention. Furthermore, the term "polymerization" includes within its scope (in addition to the polymerization of a monomer alone or of two or more monomers, i. e., copolymerization) the polymerization of unsaturated monomers in the presence of a chain transfer agent, e. g., carbon tetrachloride. This latter process has been called "telomerization." See U. S. 2,440,800.

This invention is applicable to the polymerization by any unsaturated compound subject to addition polymerization by prior techniques. Optimum conditions may vary from monomer to monomer, and since liquid phase polymerization is desired, gases such as ethylene and propylene require pressure.

The polymerizations are usually carried out at —40° C. to 60° C. and preferably at —25 to +30° C. Temperatures may be lower; however, the rate of polymerization is generally low. Higher temperatures may be used particularly when the time of polymerization is to be kept at a minimum, e. g., in a continuous process. In general, the time required for substantial polymerization depends upon other variables, such as the specific temperature and concentrations of monomer, catalyst, etc. Times of from one to twenty-four hours are customarily employed although the polymerization may require only a few minutes.

The polymerization may be carried out by conventional means in aqueous systems in which the catalyst, monomer, and diluent are preferably uniformly distributed, e. g., solutions or emulsions.

The titanous ion is generally present in amounts of 0.01 to 5% based on the weight of polymerizable monomer. A suitable source of titanous ion is titanium trichloride which is readily available.

In the process of this invention there is employed for the polymerization of addition polymerizable ethenoid monomers an aqueous solution containing titanous ion and a hydroxylamino compound, i. e., one having trivalent nitrogen bonded to but one oxygen and to that by a single covalent bond. Preferred, for reasons of availability and operative convenience, are the hydroxylamino compounds of the formula

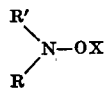

where R and R' are monovalent radicals, including hydrogen, but otherwise preferably organic radicals or R and R' together may form a divalent organic radical and X is hydrogen or an inorganic salt forming group. Thus, there may be employed hydroxylamine or a salt thereof, an oxime, particularly of a lower aliphatic oxo compound, i. e., of one to ten carbons, a hydroxamic acid and in general hydroxylamines having the hydroxylamino nitrogen bonded, by a single covalent bond, to the hydroxylamino oxygen which oxygen is further bonded to a monovalent inorganic radical, including hydrogen. The present invention is therefore inclusive of the use of hydroxylamine and its salts, e. g., the hydrochloride or sulfate; oximes, e. g., acetone oxime, cyclohexanone oxime, butyraldehyde oxime, formoxime; hydroxamic acids, e. g., benzenesulfohydroxamic acid, adipohydroxamic acid, sebacohydroxamic acid, and water soluble salts of hydroxylaminesulfonic acids, e. g., KO$_3$SON(SO$_3$K)$_2$ and HON(SO$_3$K)$_2$.

The amount of the hydroxylamino compound present may vary within wide limits but is generally present in amounts of 0.001 to 5% based on the weight of the polymerizable monomer.

As illustrated by the examples, the process of this invention results in rapid polymerizations of polymerizable monomers at low temperatures.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition polymerization of ethylenically unsaturated monomers subject to addition polymerization, the improvement wherein said monomer is polymerized by bringing the same in contact with an aqueous dispersion containing titanous ion and a hydroxylamino compound.

2. In the addition polymerization of ethylenically unsaturated monomers subject to addition polymerization, the improvement wherein said monomer is polymerized by bringing the same in contact with an aqueous dispersion containing titanous ion and a hydroxylamino compound containing the nucleus >N—O— wherein the free valences of the nitrogen are bonded to monovalent radicals and the free valence of the oxygen is bonded to a monovalent inorganic radical.

3. In the addition polymerization of ethylenically unsaturated monomers subject to addition polymerization, the improvement wherein said monomer is polymerized by bringing the same in contact with an aqueous dispersion containing titanous ion and a hydroxylamino compound of the class consisting of hydroxylamine, salts thereof, oximes, hydroxamic acids, and hydroxylaminesulfonic acids and salts thereof.

4. In the addition polymerization of ethylenically unsaturated monomers subject to addition polymerization, the improvement wherein said monomer is polymerized by bringing the same in contact with an aqueous dispersion containing titanous ion and hydroxylamine.

5. In the addition polymerization of ethylenically unsaturated monomers subject to addition polymerization, the improvement wherein said monomer is polymerized by bringing the same in contact with an aqueous dispersion containing titanous ion and hydroxylamine in the form of an inorganic acid salt thereof.

6. In the addition polymerization of ethylenically unsaturated monomers subject to addition polymerization, the improvement wherein said monomer is polymerized by bringing the same in contact with an aqueous dispersion containing titanous ion and an oxime of an aliphatic oxo compound.

7. In the addition polymerization of ethylenically unsaturated monomers subject to addition polymerization, the improvement wherein said monomer is polymerized by bringing the same in contact with an aqueous dispersion containing titanous ion and an oxime of an aliphatic oxo compound of one to ten carbons.

8. In the addition polymerization of ethylenically unsaturated monomers subject to addition polymerization, the improvement wherein said monomer is polymerized by bringing the same in contact with an aqueous dispersion containing titanous ion and a hydroxamic acid.

9. In the addition polymerization of ethylenically unsaturated monomers subject to addition polymerization, the improvement wherein said monomer is polymerized by bringing the same in contact with an aqueous dispersion containing titanous ion and a hydroxamic acid in the form of a water soluble salt thereof.

10. In the addition polymerization of ethylenically unsaturated monomers subject to addition polymerization, the improvement wherein said monomer is polymerized by bringing the same in contact with an aqueous dispersion containing titanous ion and a hydroxylamine having a single covalent bond to the hydroxylamine oxygen which oxygen is further bonded to a monovalent inorganic radical.

11. In the addition polymerization of ethylenically unsaturated monomers subject to addition polymerization, the improvement wherein said monomer is polymerized by bringing the same in contact with an aqueous dispersion containing titanous chloride, $TiCl_3$, and a hydroxylamino compound.

12. In the addition polymerization of acrylonitrile, the improvement wherein acrylonitrile is polymerized by bringing the same in contact with an aqueous dispersion containing titanous ion and a hydroxylamino compound.

13. In the addition polymerization of vinyl chloride, the improvement wherein vinyl chloride is polymerized by bringing the same in contact with an aqueous dispersion containing titanous ion and a hydroxylamino compound.

EDWARD G. HOWARD, Jr.

No references cited.